United States Patent [19]
Mori

[11] 3,809,198
[45] May 7, 1974

[54] CLUTCH DISC WITH COIL AND RUBBER SPRINGS

[75] Inventor: Masanori Mori, Toyota City, Japan

[73] Assignee: Aisin Seiki Kabushiki Kaisha, Kariya City, Japan

[22] Filed: June 29, 1972

[21] Appl. No.: 267,415

[30] Foreign Application Priority Data
June 29, 1971 Japan.............................. 46-056739

[52] U.S. Cl.......... 192/106.2, 192/106.1, 64/DIG. 2
[51] Int. Cl............................................. F16d 13/64
[58] Field of Search...................... 192/106.1, 106.2

[56] References Cited
UNITED STATES PATENTS

| | | | |
|---|---|---|---|
| 2,028,951 | 1/1936 | Reed | 192/106.2 |
| 2,058,575 | 10/1936 | Drude | 192/106.2 |
| 2,065,601 | 12/1936 | Meyer | 192/106.2 |
| 3,138,039 | 6/1964 | Zeidler et al. | 192/106.2 X |

*Primary Examiner*—Benjamin W. Wiche
*Attorney, Agent, or Firm*—Oblon, Fisher, Spivak, McClelland & Maier

[57] ABSTRACT

A clutch disc, particularly for use in motor vehicles, having at least two different types of elastic means, such as coil springs and elastic members of rubber, for absorbing torsional vibrations of the clutch disc, wherein openings in which one of the two different types of elastic means are disposed are designed such that no elastic force will act in one of the torque transmitting directions of the clutch disc, whereby it is possible to eliminate abnormal noises which are generated during substantially any stage of the torque transmission.

5 Claims, 4 Drawing Figures

CLUTCH DISC WITH COIL AND RUBBER SPRINGS

BACKGROUND OF THE INVENTION

This invention relates generally to improvements in clutch disc assemblies, and more particularly to clutch disc assemblies of the cushion type for use in motor vehicles.

In clutch discs currently used for vehicles, a friction damper or similar means is employed for absorbing torsional vibrations in the driving system to prevent generation of abnormal noises. Such means, however, are quite incapable of perfectly arresting the abnormal noises which are produced during torque transmission. This is because it is nearly impossible to frictionally absorb all of the unnecessary vibration energies merely by providing a damper means and also because it is impossible to perfectly prevent resonance in the driving system because of the characteristic of such conventional damping devices that they are always fixed relative to the angle of torsion of the clutch disc.

In other words, while an extremely high absorbing energy is required for absorbing the driving noises of the clutch disc when the vehicle is running with a high torque, only a small absorbing energy is required when the vehicle is running with a low torque or with a counter torque, so that the amount of absorbing energy acting effectively in high torque running proves to be too much for the purpose in low torque running, resulting in poor or no torsional action being made.

As an alternative means, there has been proposed a mechanism utilizing a cam means being arranged such that a high absorbing energy will be afforded when the angle of torsion becomes large. However, this mechanism necessarily has the same positive and negative characteristics and is attended by the drawback that the absorbing energy decreases in use. Furthermore, it has been ascertained experimentally that abnormal noises may be effectively prevented by providing a relatively small absorbing energy on the negative side as compared with the positive side of torque transmission when the vehicle is being driven with a counter torque.

Thus, in order to eliminate substantially any abnormal noise at the times of high and low torque, at neutral and at the time of counter torque, it is necessary to provide a high absorbing energy on the positive side such that the absorbing energy will be increased as the angle of torsion is enlarged and to provide a small absorbing energy on the negative side such that this absorbing energy will be of an extremely small amount at a point where the angle of torsion is substantially zero.

SUMMARY OF THE INVENTION

It is therefore a principal object of the present invention to provide an improved clutch disc assembly which overcomes the drawbacks mentioned above in the prior art by employing the above-mentioned requirements.

Another object of the present invention is to provide an improved clutch disc assembly which is simple in construction and low in manufacturing cost.

According to the present invention, briefly summarized, there are provided at least two types of elastic means, such as coil springs and elastic members constructed of rubber, wherein the openings in which one of the two types of elastic means are inserted are designed such that no elastic force will act in one of the torque transmitting directions of the clutch disc.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and in which.

DETAILED DESCRIPTION OF A PREFERRED EMBODIMENT

Figure 1:
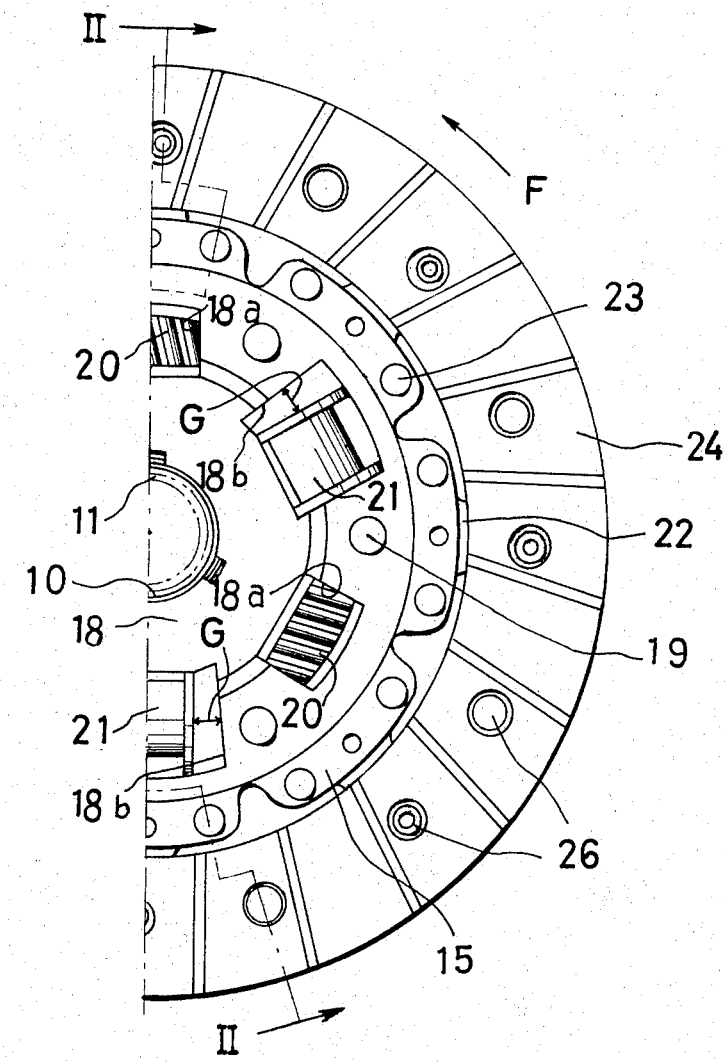
FIG. 1 is a partial side elevational view of a preferred embodiment of the present invention.

Referring now to the drawings, a clutch disc assembly is shown having a hub member 10 which is provided therein with an internally splined axial bore 11 whereby the clutch disc assembly is drivingly mounted on a drive shaft, not shown, and is thus adapted for sliding movement axially thereon, the hub member 10 also having an annular flange 12 extending radially outwardly therefrom.

On both sides of the flange 12 of the hub member 10, there are positioned friction linings 13 and 14. A main plate 15 is provided on the outside of the friction lining 13, extending radially outwardly from the hub member 10 to a point beyond the outer periphery of the flange 12. On the outside of the other friction lining 14, there is provided a friction plate 16, on the outside of which is further mounted a friction spring 17, and on the outside of this friction spring 17 there is still further provided a sub-plate 18 which extends radially outwardly from the hub member 10 to a point adjacent the outer periphery of the flange 12.

Figure 2:
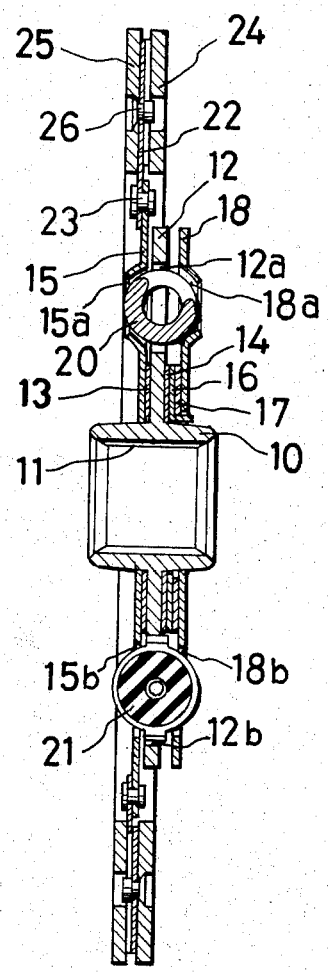
FIG. 2 is a sectional view taken along the plane of line II-II of FIG 1.

Both the main plate 15 and the sub-plate 18 are connected to each other by a plurality of stopper pins 19, as shown in FIG 1, such that the main plate 15 and the sub-plate 18 are tied together for simultaneous movement and are maintained in parallel spaced relationship axially, as shown in FIG. 2. The friction linings 13 and 14, friction plate 16 and friction spring 17 may be seen to constitute a friction damper means for absorbing torsional vibrations.

The main plate 15, flange 12 and sub-plate 18 are provided with a plurality of openings 15a, 12a and 18a, respectively, being circumferentially arranged therein as shown in FIG. 1 and being arranged in series axially as shown in FIG. 2, and each having the same width circumferentially as shown in FIG. 1, that is, in the direction of torque of the clutch disc. A coil spring 20 is inserted in each series of openings 15a, 12a and 18a for providing a flexible or yieldable driving connection between the main plate 15 and the hub member 10, there being three such series of openings 15a, 12a and 18a shown along the circumference in the illustrated preferred embodiment.

Likewise, the main plate 15, flange 12 and sub-plate 18 are also provided with a plurality of openings 15b, 12b and 18b, respectively, being circumferentially arranged therein as shown in FIG. 1 and being arranged in series axially as shown in FIG. 2, the openings 15b and 18b being of the same width circumferentially, that is, in the direction of torque of the clutch disc, but being greater in width than the openings 12b in the same direction. In each series of such openings 15b, 12b and 18b there is fitted an elastic member 21, preferably made of rubber, for providing a flexible or yieldable driving connection between the main plate 15 and the hub member 10, with a clearance G being left in both of the openings 15b and 18b on the side of positive torque transmission of the clutch disc. In the case of the illustrated preferred embodiment, three such series of openings 15b, 12b and 18b are provided along the circumference being alternately arranged with the series of openings 15a, 12a and 18a.

A plurality of leaf springs 22 are connected to the outer periphery of the main plate 15 by suitable means, such as rivets 23. Frictional facings 24 and 25, which may be made of any suitable friction material, are secured to the leaf springs 22 radially outside the extent of main plate 15 by rivets 26 which are disposed in respective axially aligned bores of the facings.

Figure 3:
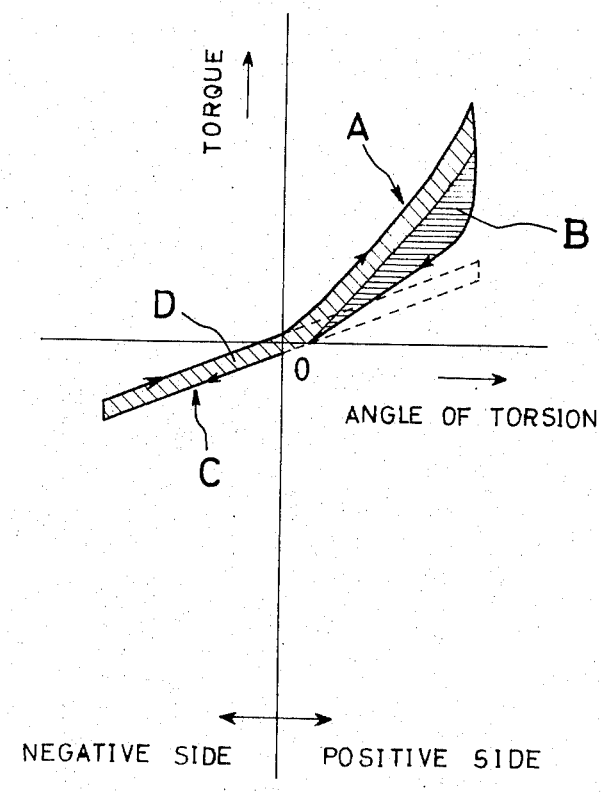
FIG. 3 is a diagram showing the characteristics of the present invention.
Figure 4:
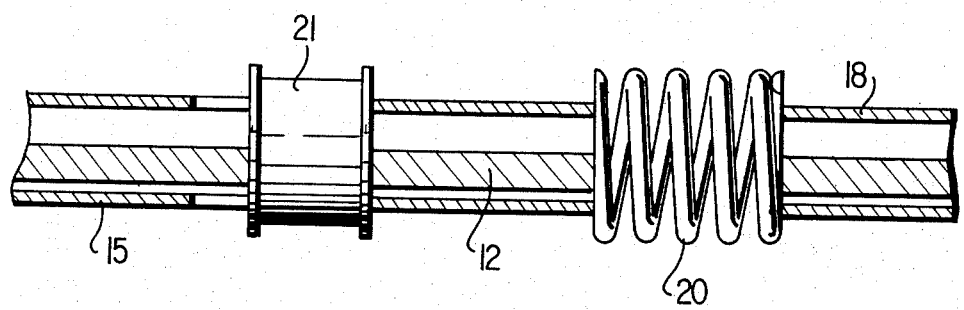
FIG. 4 is a circumferential cross-section through the springs 20 and 21 of FIG. 1.

In operation of the present device, when a torque is transmitted from the engine, not shown, both the coil springs 20 and the elastic members 21 are twisted, the characteristics thereof being shown in the characteristic diagram of FIG. 3. When the clutch disc is twisted to the positive side or in the direction of the arrow F in FIG. 1, both the coil springs 20 and the elastic members 21 of rubber accompany the friction damper act as indicated by the line A on the positive side of the characteristic diagram.

Even if the coil springs 20 undergo a compression deformation, only an extremely limited internal friction is developed therein, and hence there exists substantially no absorbing energy, while the rubber members 21 have an absorbing energy developed therein by internal friction, as indicated by the sphere of zone B, so that there is provided a large absorbing energy which is proportional to the angle of torsion.

In case the clutch disc is twisted in the reverse direction, that is, to the negative side, no torque transmission is effected through the openings 15b and 18b because of the clearances G therein, allowing only the coil springs 20 being accompanied with the friction damper to be actuated as shown by the line indicated by the arrow C on the negative side of the characteristic diagram, so that no energy absorption is effected merely with coil springs 20. However the friction damper being constituted by the friction linings 13 and 14, the friction plate 16 and the friction spring 17 is always provided with a constant absorbing energy regardless of the extent of torsion, so that slight energy absorption is effected as indicated by the sphere of zone D, even on the negative side.

As will be appreciated from the foregoing explanation, there can be obtained an absorbing energy which is made larger as the angle of torsion on the positive side is enlarged, while a comparatively small absorbing energy is provided for the angle of torsion on the negative side. Also, at a point where the angle of torsion is substantially zero, a very limited amount of absorbing energy is provided. Thus, according to the present device, an extremely effective and highly efficient absorbing action is provided to more perfectly eliminate abnormal noises developing in the driving system. Further, the present device is simple in construction and low in manufacturing cost.

Obviously many modifications and variations of the present invention are possible in light of the above teachings. It is to be understood therefore that within the scope of the appended claims, the present invention may be practiced otherwise than as specifically described herein.

What is claimed as new and desired to be secured by letters patent of the United States is:

1. A clutch disc assembly particularly for use on motor vehicles comprising:
    a hub member being provided therein with internal splines interengageable with external splines of a transmission drive shaft and thereby being adapted to be mounted on said shaft, and having a radially outwardly extending flange, said flange being provided with a plurality of first and second types of openings being circumferentially arranged therein;

disc plate means being operatively connected to said flange and having a plurality of said first and the second types of openings corresponding to said first and second types of openings in said flange and being circumferentially arranged therein, said first type of openings in said flange and said disc plate means being arranged in series axially and having the same width circumferentially, and said second type of openings in said disc plate means being arranged in series axially with the corresponding second type of openings in said flange but being different in width circumferentially from said second type of openings in said flange;

coil spring means being inserted in each series of said first type of openings in said flange and said disc plate means; and rubber elastic means possessed of internal friction caused by the deformation thereof being inserted in each seres of said second type of openings in said flange and said disc plate means.

2. A clutch disc assembly as set forth in claim 1, wherein said first and second types of openings are provided alternately, circumferentially about said flange and said disc plate means.

3. A clutch disc assembly as set forth in claim 1, wherein said disc plate means comprises a main plate and a sub-plate secured together and disposed on opposite sides axially of said flange.

4. A clutch disc assembly as set forth in claim 1, further comprising a friction damper means disposed between said hub member and said disc plate means.

5. A clutch disc assembly as set forth in claim 1, wherein said rubber elastic means is normally spaced from one end of said second type of openings in said disc plate means by an amount equal to the difference in the width of said second type of openings in said disc plate means and said flange in the direction of positive torque transmission.

* * * * *